June 29, 1943.  R. H. PENNEBAKER  2,322,772
OIL FILTER
Filed June 10, 1941  3 Sheets-Sheet 1

INVENTOR.
Robert H. Pennebaker,
BY
John B. Brady
Attorney

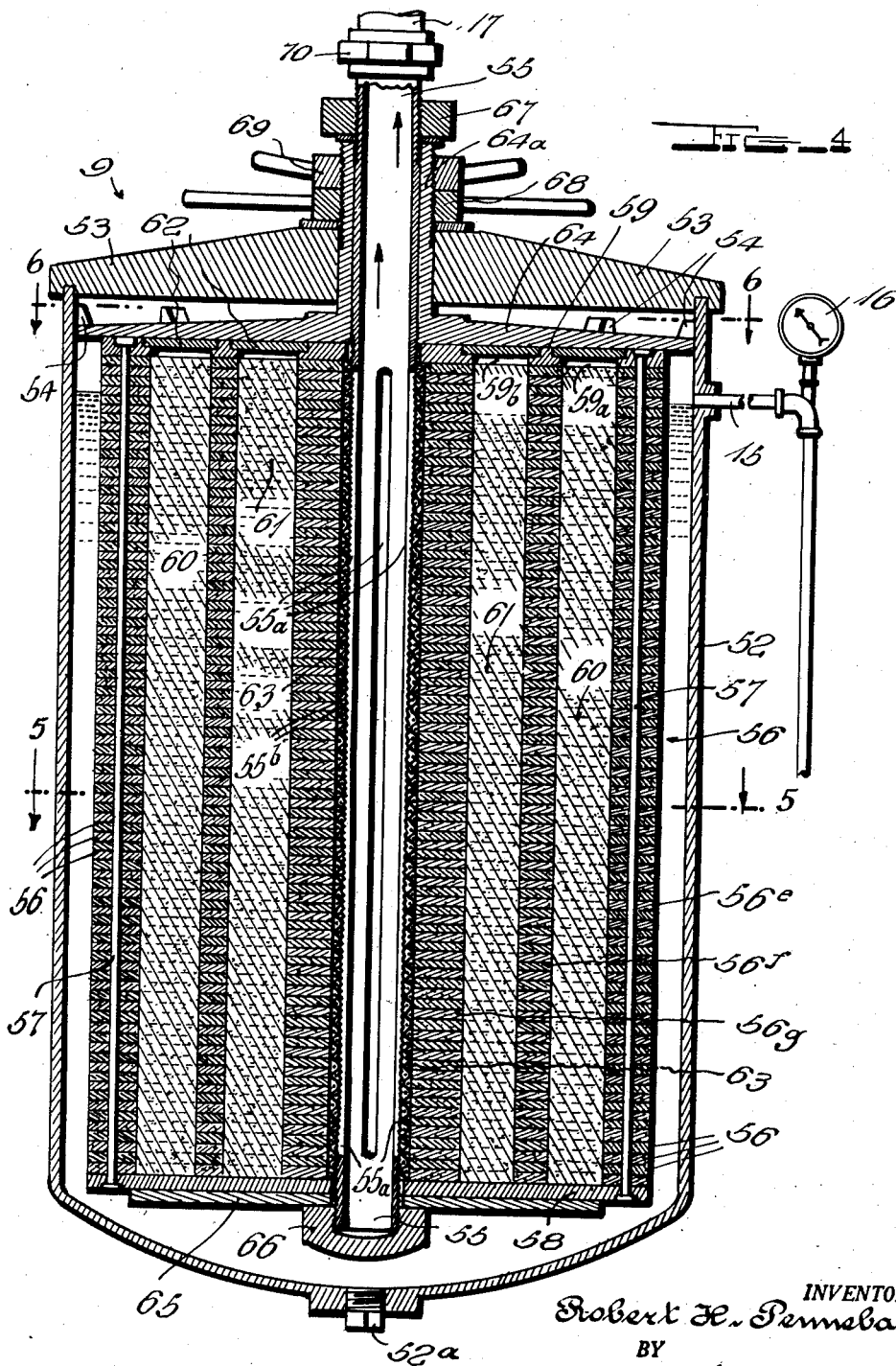

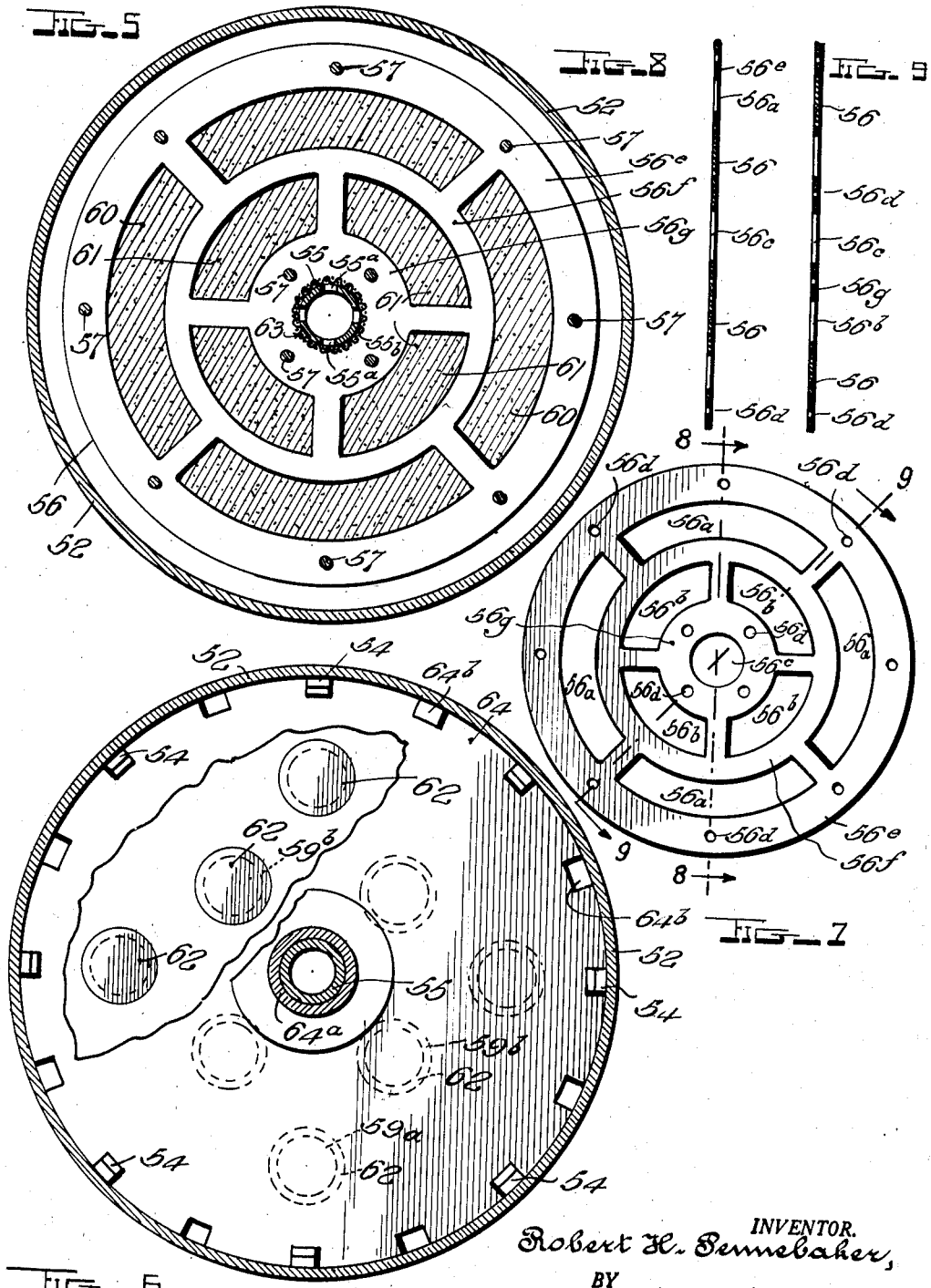

Patented June 29, 1943

2,322,772

UNITED STATES PATENT OFFICE 2,322,772

OIL FILTER

Robert H. Pennebaker, Little Rock, Ark.

Application June 10, 1941, Serial No. 397,492

7 Claims. (Cl. 210—112)

My invention relates broadly to oil purification and filtration system and more particularly to an arrangement for rejuvenating used oil and apparatus comprising such arrangement.

One of the objects of my invention is to provide a system for the purification of oil used particularly for lubrication purposes and liable to accumulate quantities of liquid and solid matter in suspension, so that such oil may continually be used for the same or different purposes.

Another object of my invention is to provide a construction of compound filter element composed of a laminated assembly of cellulose filter members having aligned openings serving to define chambers for holding filtering clay or other filtering material; the assembly, including the clay filled chambers, being compressed to provide the desired degree of effectiveness in the filter element, and having a central outlet passage for the filtered oil.

Figure 1:
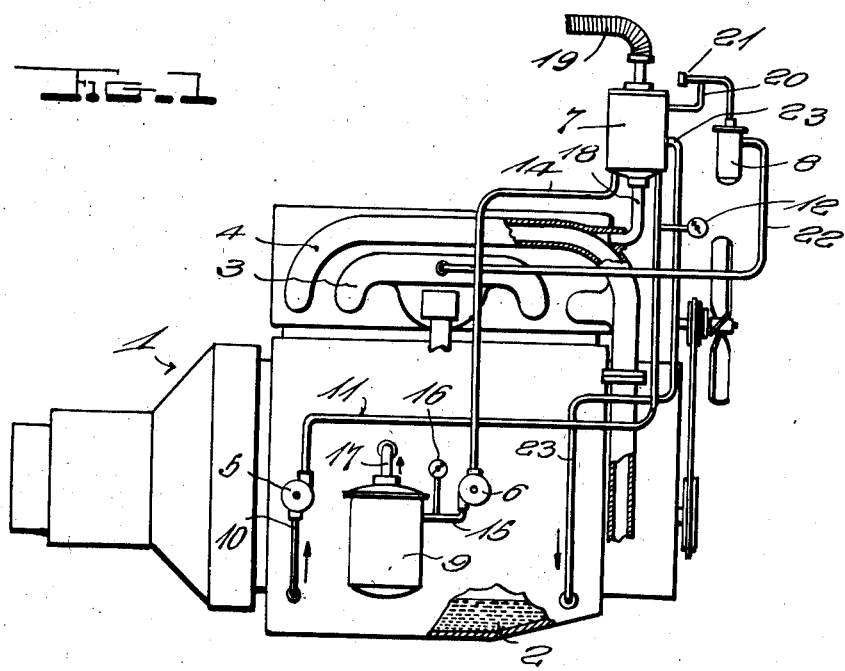
Figure 2:
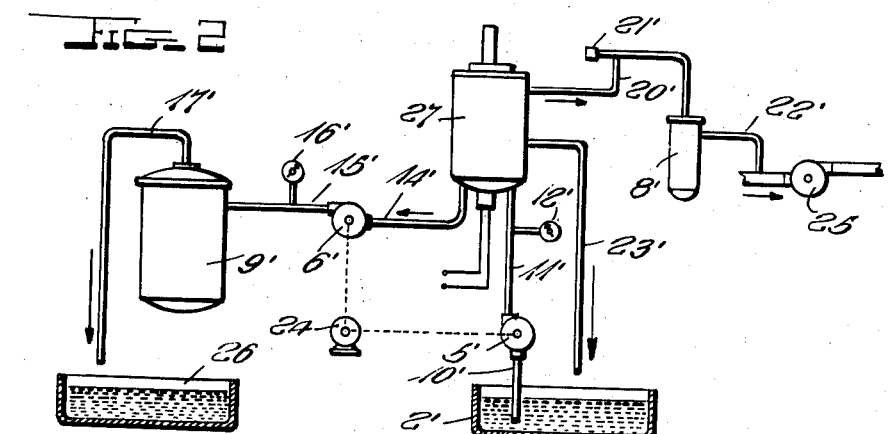
Figure 3:
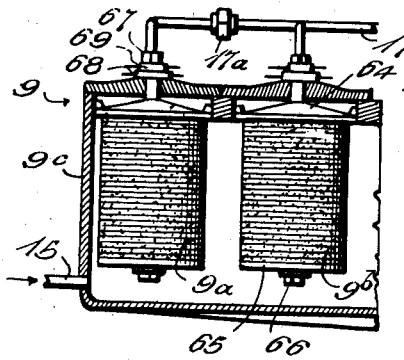

Other and further objects of my invention reside in the system and apparatus hereinafter more fully described with reference to the accompanying drawings in which:

Figure 1 is a diagrammatic view showing an application of the oil filter of my invention to the oil purification system of an internal combustion engine of a type used in automotive vehicles; Fig. 2 shows an application of my invention to an oil purifying and filtering system adapted for industrial uses; Fig. 3 is a partial sectional view indicating the arrangement of a plurality of oil filters in a single casing for enlarging the capacity of the filtering system; Fig. 4 is a vertical sectional view of the compound filter of my invention; Fig. 5 is a horizontal sectional view taken substantially on line 5—5 in Fig. 4; Fig. 6 is a horizontal sectional view taken substantially on line 6—6 in Fig. 4; Fig. 7 is a plan view of one of the cellulose laminations employed in the filter means of Fig. 4; and Figs. 8 and 9 are sectional views of the filter element taken on lines 8—8 and 9—9, respectively, in Fig. 7.

In the purification and filtering of used oil for lubrication purposes, it is highly important to remove all foreign matter that the oil may have accumulated in suspension and/or solution during its prior use. Oil used in the crank-cases of internal combustion engines, for example, may become diluted by raw fuel which seeps past the pistons, mixed with water and/or moisture which enters through the crank-case ventilation system and/or accumulates from condensation after the engine or equipment has been shut down or stopped. The change from operating temperature to atmospheric temperature usually causes condensate to accumulate in engine crank cases, oil sumps and reservoirs especially during winter season. This moisture and/or condensate together with carbon and metallic particles and other foreign matter, form what is usually called "sludge." If this undesirable material is left in the oil, stoppage of the lubrication system will eventually result followed by abnormal wear on all moving parts and cause engine or bearing failure. The purification and filtering system of my invention has been devised to purify the oil to substantially its original condition so that it may be circulated with perfect safety through the bearing parts of the engine preventing excessive wear and corrosion and giving longer and more satisfactory service.

The purification and filtering system of my invention comprises two principal stages, dehydration and filtration. A primary filter screen is provided in the dehydrator for immediately removing the largest particles and heaviest sludge from circulation. All readily volatile substances accumulated in the oil are removed in the dehydrator proper, and passed to a condenser from which they may be periodically cleared; means are preferably provided for forcing the evacuation of vapors from the dehydrator as they are produced, to avoid their condensation and return to the body of oil being treated. From the dehydrator the oil is delivered under pressure to a filter device wherein solid particles of even very minute size are trapped. The provision of dehydrating means operating prior to the filter in the purification and filtering system of my invention preserves the filter from the deleterious action of moisture and such diluents as otherwise would be present in the oil to be filtered. Suitable thermostatic and pressure control means are provided at various positions in the system to assure regular flow and proper treatment of the oil in the respective stages of the system.

Referring to the drawings in more detail, Fig. 1 illustrates diagrammatically an internal combustion engine of automotive type at 1, having an oil reservoir in the crankcase at 2, intake manifold at 3 and exhaust manifold at 4. Oil pumps are indicated at 5 and 6, driven through conventional means by the engine. The oil purification and filtering system of my invention comprises the dehydrator 7 and associated condenser 8, and the oil filter at 9. Connections include pipe 10 leading from the oil reservoir 2 to pump 5, pipe 11 connecting therefrom to the dehydrator 7 and provided with tell-tale gage 12, pipe 14 leading from the dehydrator to the pump 6, pipe 15 connecting therefrom to the filter 9 and provided with tell-tale gage 16, and outlet 17 leading to the engine parts to be lubricated wherefrom oil is returned to the crankcase 2. Heat is supplied to the dehydrator from hot exhaust gases led by conduit 18 from the exhaust manifold 4 through the dehydrator 7 and discharged through a flexible tube 19. Vapors liberated in the dehydrator 7 are drawn off through pipe 20 into condenser 8 by suction induced through an aspirator opening at 21 as a result of connection 22 to the intake manifold 3 of the engine. An overflow pipe 23 is provided to return excess oil from the dehydrator 7 directly to the oil reservoir or crankcase 2.

The system illustrated in Fig. 2 employs elements of similar constitution but adapted for industrial application. Reference characters 2′, 5′, 6′, 8′—12′, 14′—17′ and 20′—22′ indicate elements corresponding to those represented by the same numerals in Fig. 1. Pumps 5′ and 6′ require driving means such as motor 24, and the induction tube 22 requires a source of air suction such as the intake of an air pump 25. Discharge of oil from the filter 9′ may be into a receiver 26 for filtered oil, as shown, or directly to the parts to be lubricated. The principal distinction in the system of Fig. 2 is the type of dehydrator employed. The dehydrator 27 is similar to that at 7, Fig. 1, except for the heat supply which is electric in the modified form of dehydrator.

Fig. 3 illustrates a filter 9 comprising a number of filter units 9a, 9b ... enclosed in casing 9c and connected at their outlets to the common outlet 17, with detachable couplings as at 17a provided for separate removal and replacement of the several units as may be required. The single inlet is shown at 15 in casing 9c. The arrangement is particularly adaptable for industrial applications where the capacity of the system must be greater than afforded by a single filter unit. The mountings of the several units are similar to the arrangement hereinafter described in reference to Figs. 4 and 6.

The construction of the filtering device of my invention is illustrated in detail in Figs. 4-9. The filter may be used in the systems of both Figs. 1 and 2 in single arrangement or in multiple arrangement within a casing, where added capacity is required as shown in Fig. 3. The filter comprises a casing 52 open at the top and provided with a clean-out plug 52a in the closed bottom thereof, a cover member 53 for the casing, the filter unit itself within the casing supported from the cover member 52, and means coacting with lugs 54 on the casing for securing the cover member 53 in position. The inlet pipe 15 connects with the casing 52, as indicated, and the outlet pipe 17 connects with a conduit 55 which extends through the filter unit and serves also for mounting the unit in connection with the cover member 53.

The filter unit is a composite structure including, as filtering means, a plurality of cellulose elements indicated at 56, one of which is illustrated in detail in Figs. 7-9, filtering clay in a plurality of sections at 60, 61, and a fine mesh filter screen at 63. The cellulose elements, as shown in Figs. 7-9, are die-formed from sheet material of uniform thickness—approximately .04″—and provided with openings outer segmental openings 56a, inner segmental openings 56b and central circular openings 56c, and also with apertures designated generally at 56d. The several elements are arranged in superposed relation as shown in Fig. 4, with the various openings and apertures in alignment, and rods 57 extending through the apertures 56d. A base plate 58 receives the lower ends of the rods 57 and supports the laminated assembly of cellulose elements 56, providing closures for the openings 56a and 56b but having an aligned central opening. A cover plate 59 receives the upper ends of the rods 57 and has openings, shown more particularly in Fig. 6, at 59a and 59b, aligned with the spaces provided by openings 56a and 56b, respectively, in the several laminations 56, and also a central aligned opening. When the unit is initially constructed, the laminations are compressed to the desired degree—suitable for the viscosity of the particular oil to be filtered—and the rods 57 are secured in the plates 58 and 59 to maintain the compression. The aligned openings in the several laminations 56 thus form compartments for filter clay, at 60 and 61, which is introduced through the openings 59a, 59b, respectively, in plate 59, with the unit on a shaking jig to compact the clay as tightly as possible.

When filled, the compartments are closed by discs indicated generally at 62 which seal the openings 59a, 59b; alternately a one piece annular plate may be employed to cover all the openings 59a, 59b, and be sealed at its inner and outer peripheries to the plate 59. The filter unit thus constructed is ready to be mounted in the filter casing 52.

The central openings through the several laminations 56 and plates 58 and 59 of the filter unit form an outlet passage, as the filter is adapted to pass oil radially through the cellulose elements 56 and the interposed filter clay sections 60 and 61. The outer annular portion 56e of the cellulose elements, the intermediate portion 56f and the inner portion 56g constitute separate filter stages, with the intermediate and inner portions 56f and 56g serving also to keep particles of the filter clay from the oil stream. As a further and final filtering device, the exceedingly fine mesh metallic screen 63, of "Monel" metal or the like, is provided of tubular construction and disposed within the central outlet passage through the filter unit. The screen 63 is supported by the conduit 55 which extends coaxially of the filter unit. There are longitudinal slots 55a in the conduit 55 along the portion thereof within the limits of the filter unit, to pass filtered oil, and preferably there are also circumferential grooves or screw threads 55b throughout the same portion of the conduit 55 to facilitate movement of the filtered oil into the slots 55a and thence through the conduit to the outlet of the filter.

The filter unit is secured in relation to the conduit 55 between a head plate 64 and a bottom plate 65. Screw threads at the lower end of conduit 55 are engaged by a closed nut 66 for retaining the bottom plate 65. The head plate 64 has an upstanding collar portion 64a which extends concentric with the conduit 55 through the cover member 53; and the conduit 55 has screw threads on its upper end engaged by nut 67 for retaining the plate 64. The outlet pipe 17 is connected with conduit 55 by a coupling 70 and is disconnected when it is necessary to remove the filter unit from the casing. The filter unit is removable from the conduit 55 either by detachment of nut 66, whereupon plate 65 and the unit may be removed in a downward direction, or by detachment of nut 67 whereupon the conduit may be withdrawn from the collar 64a and the filter unit removed in the upward direction.

The means for securing the cover member 53 on the casing 52 comprise screw threads on the collar 64a of head plate 64 which are engaged by wing-nut 68 and lock nut 69 bearing on the cover member 53, and the lugs 54 on the casing 52 which are engaged by the plate 64. As shown more clearly in Fig. 6, plate 64 has notches 64b which permit the plate to pass the lugs 54 upon insertion or removal of the filter unit, but with limited angular rotation of the head plate, solid portions thereof coact with the lugs 54 and the cover member 53 is secured when the wing-nut 68 is turned to draw plate 64 upward against the lugs 54. Upon loosening nuts 69 and 68, head plate 64 may be turned until notches 64b are aligned with lugs 54, whereupon the cover member 53 and the entire filter unit assembly may be removed from the casing 52, for cleaning the filter unit, or replacing it with a fresh unit as described.

For the purpose of rejuvenating the filtering unit of my invention, I may provide a suitable nozzle-like device adapted to enter the central aperture through the filter elements and supply a cleaning solvent capable of dissolving sludge foreign matter, carbon formation and motor varnish and lacquer, under pressure. By slowly back washing the filtering unit, I am able to rejuvenate a filtering unit which has become inefficient.

In the operation of the system of my invention, used oil is supplied to the dehydrator and therein heated to a temperature of approximately 350° F. which is sufficient to vaporize moisture and diluents in the used oil. The treated oil is discharged at approximately 250° F. and supplied under pressure to the filter wherein it penetrates the cellulose filter portions and intermediate clay sections to emerge, through the final filter screen into the conduit leading to the outlet, as filtered oil free of all solids and moisture.

The tell-tale gages provided at 12 and 16 afford indications of the internal condition of the primary filtering screen of the dehydrator and filter, respectively, showing actual conditions as the elements become clogged with accumulations of sludge and/or various other impurities removed from the used oil. The passage of oil through the dehydrator normally occurs at zero pressure, but when the primary filtering screen of the dehydrator becomes clogged the pressure rises in the delivery line and causes operation of the telltale gage 12, indicating the necessity of removing the obstructions. In the filter unit of my invention, the several laminations of cellulose material are compressed to such a degree that the filtering action is substantially through the cellulose material and not through minute spaces separating the laminations. The die-formed laminations being of uniform size and thickness constitute in the assembly described a unit of uniform effectiveness, not only in respect to filtration by the material of the laminations but also in the provision of compartments for the filtering clay which is confined within the compartments so that particles thereof cannot escape into the oil stream.

The material of the laminations employed in the filter unit is preferably 100% pure cellulose, which is available commercially in sheets of suitable thicknesses for cutting by dies into elements of the form described. Other materials having substantially the same characteristics and effectiveness may be employed, however, as will be understood. Any suitable filtering clay, such as fuller's earth, may be employed in the several compartments of the filter element to secure the desired results.

While I have described my invention in certain preferred embodiments, I desire it understood that modifications may be made therein, and that no limitations upon my invention are intended thereby but only such as are imposed by the scope of the appended claims.

What I claim as new and desire to secure by Letters Patent of the United States is as follows:

1. In an oil purification and filtering system, a filter comprising a cup-shaped casing having an inlet for used oil, a cover for said casing having an outlet conduit extending therethrough, a filter unit, means for mounting said unit concentrically with said outlet conduit in connection with said cover, said outlet conduit comprising a tubular member having longitudinal slots for admitting filtered oil; and said filter unit comprising an assembly cylindrical in form and having an axial opening for said tubular conduit member, oil being filterable radially through said assembly into said slots and the outlet conduit; and said means for mounting said unit consisting of retaining and closure means at the inner end of said tubular member, a plate bearing on said filter element and having a sleeve portion extending through said cover concentric with said tubular member, and screw means on said tubular member coacting with said sleeve portion for maintaining said filter unit in relation to said retaining means.

2. In an oil purification and filtering system, a filter comprising a cup-shaped casing having uniformly spaced retaining lugs disposed about the internal periphery of the opening of said casing, a cover for said casing, a plate member having notches corresponding to the lugs on said casing and a central upstanding cylindrical portion extending through said cover, screw means on said cylindrical portion coacting with said cover, said plate member being engageable below said lugs and brought into abutment therewith by operation of said screw means for securing said cover on said casing, a filter unit mounted in connection with said plate member, an oil inlet connection in said casing, and an oil outlet connection in said plate member extending through the central cylindrical portion of said member.

3. A filter as set forth in claim 2 wherein said outlet connection comprises a tubular member having longitudinal slots for admitting filtered oil and extending interiorly of said casing, and said filter unit comprises an assembly cylindrical in form and having an axial opening for said tubular member, oil being filterable radially through said assembly into said slots and the outlet connection; and including means for mounting said unit comprising retaining and closure means at the inner end of said tubular member and screw means on the outer end of said tubular member coacting with the cylindrical portion of said plate member for maintaining said filter unit in connection with said plate member.

4. In an oil purification and filtering system, a filter unit comprising a laminated assembly of flat filter elements, said elements having aligned sectional openings within the limits of their periphery constituting sectional compartments within said laminated assembly, end plates for said assembly providing closures for said compartments, rod means for connecting said end plates and maintaining said flat filter elements bound in compressed relation; and a body of filter clay in each of said compartments, said filter unit having a central opening therethrough normal to said flat filter elements, oil being filterable radially through said filter elements and through the filter clay in the sectional compartments into said central opening.

5. In an oil purification and filtering system, a filter unit comprising a laminated assembly of flat filter elements, said elements having aligned segmental shaped openings within the limits of their periphery constituting segmental shaped compartments within said laminated assembly, end plates for said assembly providing closures for said segmental shaped compartments, rod means for connecting said end plates and maintaining said flat filter elements bound in compressed relation; and a body of filter clay in each of said segmental shaped compartments, said filter unit having a central opening therethrough normal to said flat filter elements, oil being filterable radially through said filter elements and through the filter clay in the segmental shaped compartments into said central opening.

6. In an oil purification and filtering system, a filter unit comprising a laminated assembly of flat filter elements, said elements having aligned segmental shaped openings within the limits of their periphery constituting segmental shaped compartments within said laminated assembly, said segmental shaped openings being disposed in different circular concentric paths spaced radially one from the other, end plates for said assembly providing closures for said segmental shaped compartments, rod means for connecting said end plates and maintaining said flat filter elements bound in compressed relation, and a body of filter clay in each of said segmental shaped compartments, said filter unit having a central opening therethrough normal to said flat filter elements, oil being filterable radially through said filter elements and through the filter clay in the segmental shaped compartments into said central opening.

7. In an oil purification and filtering system, a filter unit comprising a laminated assembly of flat filter elements, said elements having aligned segmental shaped openings within the limits of their periphery constituting segmental shaped compartments within said laminated assembly, said segmental shaped compartments being disposed in annular paths spaced and off-set radially one with respect to another, end plates for said assembly providing closures for said segmental shaped compartments, said filter unit having a central opening therethrough normal to said flat filter elements, oil being filterable radially through said filter elements and through the filter clay in the segmental shaped compartments into said central opening.

ROBERT H. PENNEBAKER.